D. P. O'KEEFE.
LUGGAGE CARRIER.
APPLICATION FILED JUNE 12, 1919.

1,385,640.

Patented July 26, 1921.

INVENTOR:
DANIEL P. O'KEEFE,
BY
ATTORNEY.

UNITED STATES PATENT OFFICE.

DANIEL P. O'KEEFE, OF LOS ANGELES, CALIFORNIA.

LUGGAGE-CARRIER.

1,385,640.        Specification of Letters Patent.        Patented July 26, 1921.

Application filed June 12, 1919. Serial No. 303,643.

*To all whom it may concern:*

Be it known that I, DANIEL P. O'KEEFE, a citizen of the United States, residing at Los Angeles, in the county of Los Angeles and State of California, have invented new and useful Improvements in Luggage-Carriers, of which the following is a specification.

This invention relates to luggage carriers for automobiles and other vehicles, and it has for its object to provide an improved luggage carrier which will be superior in point of relative simplicity and inexpensiveness of construction, taken in conjunction with positiveness and efficiency in action, durability, convenience in application, removal and manipulation, and compactness in form and neatness in appearance, and which will be generally superior in serviceability and adaptability to a wide range of uses or to use with a wide range of loads or articles of luggage.

With the above and other objects in view, the invention consists in the novel and useful provision, formation, construction, combination, association and application of parts, members and features, all as hereinafter described, shown in the drawing, and finally pointed out in claims.

In the drawing.

Corresponding parts in all the figures are designated by the same reference characters.

Figure 2:
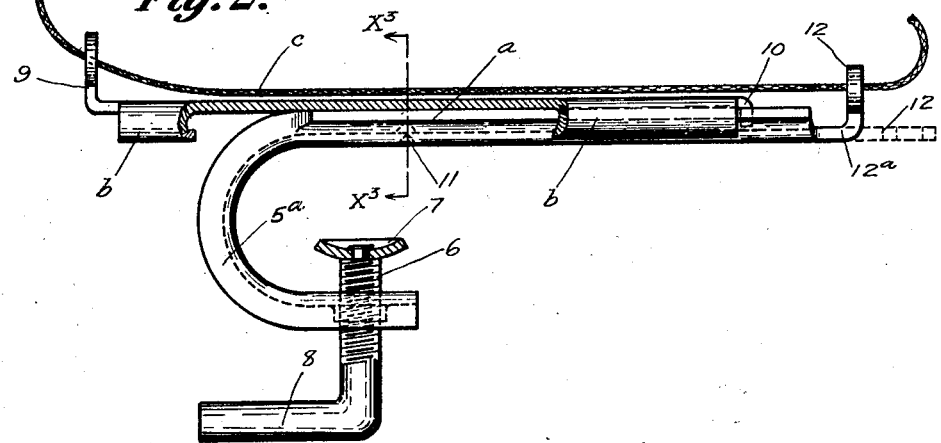
Fig. 2 is an enlarged partly broken away and sectioned view of the luggage carrier, of which two are shown in Fig. 1, a flexible member thereof being only fragmentarily shown.
Figure 3:
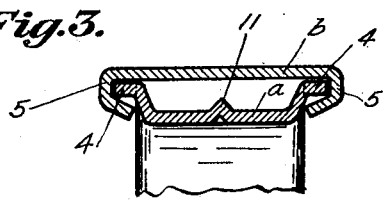
Fig. 3 is a detail transverse sectional view taken upon the line $x^3$—$x^3$, Fig. 2, and looking in the direction of the appended arrows.

Referring now particularly to the drawing, the improved carrier shown therein comprises two slidably connected and jointly extensible members, $a$ and $b$, each of which is elongated in form, the member $a$ being provided at its lateral edges with flat flanges or ways 4, with which coöperate and co-act curved flanges 5 upon the member $b$ and at the side edges of the same. The member $a$ is provided at one end with a curved and returned portion $5^a$ threaded to receive a threaded clamping pin 6, provided at its upper end with a loosely applied head or washer 7, between which and the body of the member $a$ the running board A, of the vehicle, or any other suitable support, is clamped. The lower end of the clamping pin 6 is provided with an angularly directed finger-piece 8 whereby the clamping pin may be manipulated. As shown, the member $a$ may, if desired, be of channel iron formation, to provide inherent rigidity and strength, and the curved flanges 5 upon the member $b$ produce similar results in that member. The carrier member $b$ is provided at one end with an upwardly directed eye 9, and at the other end with a downwardly directed stop or lug 10. The carrier member $a$ is provided adjacent to one end with a stop 11 which may be conveniently and effectively produced by striking the metal upwardly by a suitable punch. At the other end the member $a$ is provided with an eye 12 normally lying in the plane of the major portion of said member $a$, as shown in dotted lines in Fig. 2. In assembling the members $a$ and $b$ the eye 12 is introduced between the flanges $b$ so that the corresponding end of the member $a$ is first passed between said flanges at the end of the member $b$ provided with the eye 9. When the eye 12 has passed beyond the opposite ends of the flanges 5, namely, at the end of the member $b$ provided with the stop 10, the eye 12 is given an annular upward bend as at $12^a$. Now, the inadvertent displacement of one member from the other is prevented, the now upwardly directed eye 12 coacting with the stop lug 10 to limit the relative movement of the members $a$ and $b$ in one direction, and the stop 11 co-acting with the stop 10 to limit the relative movement of the members in the opposite direction. Between these limits of relative movement the play of one member with respect to the other is permitted sufficiently to provide a wide range of adjustment between the members for reception of luggage or objects or articles of different dimensions. A strap $c$ is rove through the eyes 9 and 12 extending over the top surfaces of the members $a$ and $b$, and such strap is provided at one end with a buckle device 13 with which the other free end 14 of the strap co-acts. The channel formation of the lower member $a$ provides a space between the members $a$ and $b$, which accommodates the downwardly directed stop lug 10 and leaves an undisturbed flat upper surface for the upper member, to present no inequality to the luggage or load resting upon the strap.

Figure 1:
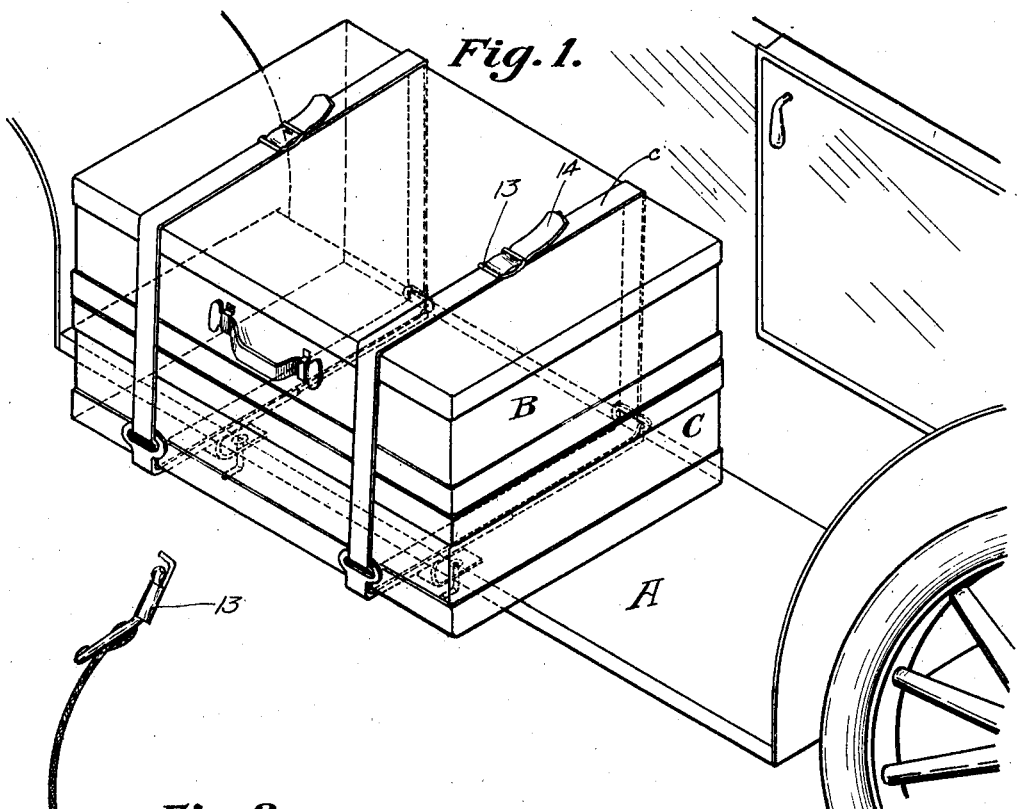
Figure 1 is an isometric view of a running board and other features of an automobile showing the invention applied thereto and in service.

In use, as will be seen from the illustration in Fig. 1, one or more of the carrier devices may be utilized in conjunction with a running-board or other support A, the member or members *a* being secured in connection with such running-board or support, so as to overlie the top surface of the same, and being held thereto by a tightened clamping pin 6. The member *b* may then be adjusted lengthwise of the member *a*, within the limits imposed by the stop 10, the stop 11 and the eye 12, the strap *c* freely running through the eyes 9 and 12 to accommodate such adjustment. The luggage, such as suit-cases B and C, may be rested upon the strap *c* which in turn rests upon the upper surfaces of the members *a* and *b*, and if two such luggage carriers are provided a double hold upon the load is obtained. The strap ends are then brought together and one free end of the strap is secured in connection with the buckle 13 upon the other free end, tightly girdling the load. In this position the load is firmly held upon the running-board and in connection with the luggage carrier applied thereto, and the strap acts as a cushioning or padding member or agent to prevent undue abrasion of the load by contact thereof with the carrier members.

The entire device is extremely simple in construction, and durable and positive in use, and may be conveniently applied in position for service and removed therefrom and also conveniently manipulated.

Having thus disclosed my invention, I claim and desire to secure by Letters Patent:

1. A luggage carrier, comprising two elongated members, means for clamping one of the same to a running-board or other support, both of said members being provided with longitudinal side flanges, two of said flanges being curved to slidably overlap the other two flanges, each of said members being provided at one end with an eye, a strap rove through said eyes and overlying said members, the upper member being provided at the end opposite the eye of that member with a stop, the lower member being provided with a stop remote from the eye of said lower member and adapted to co-act with said first named stop of said upper member, said eye of said lower member lying initially substantially within the longitudinal plane of said lower member whereby said members may be assembled together, said eye of said lower member being thereafter directed upwardly into position to engage with said stop upon the upper member; whereby, due to the co-action of said stops and said eye upon said lower member, said members are limited as to lengthwise relative movement.

2. A luggage carrier, comprising two elongated members, means for clamping one of the same to a running-board or other support, both of said members being provided with longitudinal side flanges, two of said flanges being curved to slidably overlap the other two flanges, each of said members being provided at one end with an eye, a strap rove through said eyes and overlying said members, the upper member being provided at the end opposite the eye of that member with a stop, the lower member being provided with a stop remote from the eye of said lower member and adapted to co-act with said first named stop of said upper member, said eye of said lower member lying initially substantially within the longitudinal plane of said lower member whereby said members may be assembled together, said eye of said lower member being thereafter directed upwardly into position to engage with said stop upon the upper member; whereby, due to the co-action of said stops and said eye upon said lower member, said members are limited as to lengthwise relative movement; said lower member being of channel formation, and said stop upon said upper member being downwardly directed and accommodated in said channel formation.

In testimony whereof, I have signed my name to this specification in the presence of two subscribing witnesses.

DANIEL P. O'KEEFE.

Witnesses:
A. J. LIVENGOOD,
E. FAYE HUFF.